Feb. 13, 1968  W. WROBBEL ET AL  3,368,309
MACHINE TOOL
Filed March 30, 1965  4 Sheets-Sheet 1

INVENTORS
Werner Wrobbel
Albrecht Schuzler

BY
Michael J. Striker
ATTORNEY

United States Patent Office 3,368,309
Patented Feb. 13, 1968

3,368,309
MACHINE TOOL
Werner Wrobbel and Albrecht Schnizler, Nurtingen, Germany, assignors to Metabowerke K.G. Closs, Rauch & Schnizler, Nurtingen, Wurttemberg, Germany
Filed Mar. 30, 1965, Ser. No. 443,903
Claims priority, application Germany, Mar. 31, 1964, M 60,493/64
11 Claims. (Cl. 51—37)

ABSTRACT OF THE DISCLOSURE

A carriage carrying a lever on which a tool is mounted, is moved in the same direction as a workpiece. A fluid operated motor urges the lever to a position in which the tool engages the workpiece and follows any contour of the same. The required time of engagement between the tool and the workpiece depends on the ratio between the workpiece speed and the tool speed, which is accordingly selected.

---

The present invention relates to a tool control apparatus, and more particularly to apparatus for controlling finishing operations, such as grinding or polishing of workpieces by a rotary tool.

It is known to grind and polish workpieces while the same are transported by conveyor means. The appearance of the finished surface of the workpiece depends on the time during which the rotary tool operates on a specific workpiece, assuming a given rotary speed of the tool. Planar or uniformly curved surfaces can be accurately ground and polished while the workpices are continuously transported at the same speed. However, if the surfaces of the workpieces are irregular, the required speed at which the workpieces are transported depends on the convex and concave portions of the workpiece surfaces, since the time during which the grinding or polishing tool is operative would vary for a constant speed of movement of the workpieces.

In accordance with the prior art, additional tools are provided for performing additional finishing operations on those surface portions of the workpieces which are shaped in such a manner that they would not be sufficiently finished in the time made available by the speed of travel of the workpiece past the main tool. Such additional finishing stations cause comparatively high expenses.

In accordance with another construction of the prior art, the speed at which the workpieces are transported is controlled and varied in accordance with the shape of the workpiece surface on which the tool operates. Such apparatus is expensive and complicated, and since a longer working time is required for a workpiece, the total production is reduced.

It is one object of the present invention to overcome the disadvantages of known tool control apparatus, and to operate to tool in such a manner that transported workpieces are uniformly, rapidly, and accurately finished irrespective of the shapes of the workpieces.

Another object of the invention is to provide apparatus for maintaining a tool in contact with a traveling workpiece for the time required for completion of a finishing operation.

Another object of the invention is to provide means for moving a tool at the same speed, at a higher speed, or at a lower speed than a transported workpiece which is to be machined by the tool.

Another object of the invention is to provide apparatus for machining the surfaces of transported workpieces which can be inexpensively manufactured but has a high output of finished workpieces.

With these objects in view, the present invention relates to tool control apparatus which is particularly suited for controlling the movements of a finishing tool, such as a grinding wheel or polishing wheel. One embodiment of the invention comprises guide means extending parallel to a path along which workpieces are transported at a predetermined speed; a carriage movable along the guide means and supporting a motor; a tool holder supported on the carriage for movement toward and away from the transported workpieces and being driven by the motor; first actuating means for moving the tool holder toward a workpiece; and second actuating means for moving the carriage at a selected speed parallel to the path of movement of the workpieces along the guide means. A tool held by the tool holder is thus urged against transported workpieces to follow the contour of workpiece surfaces which are not parallel to the path of the workpieces, and remains in contact with each workpiece for a time dependent on the ratio between the selected speed at which the tool and the carriage move, and the predetermined speed at which the workpieces are transported.

In the preferred embodiment of the invention, the tool holder is a double-armed lever supported on a drive shaft for angular movement so that the shaft of a grinding or polishing wheel which is mounted on the lever, is moved toward and away from the workpieces. The first and second actuating means are fluid-operated cylinder and piston means, and the carriage includes rollers running on parallel guide rails of a rectangular frame. The carriage is in the form of a plate supporting an electric drive motor and having a bearing for a drive shaft of the motor on which the tool holder lever is turnably mounted by means of another bearing.

The apparatus including the supporting frame, is a comparatively small unit which can be mounted on a suitable supporting means at any point of the conveyor on which the workpieces are supported. Due to the fact that the tool moves up and down during angular movement of the tool holder lever, the treated surfaces of the workpieces can be located at different horizontal levels, or inclined to horizontal plane, and nevertheless the tool will move along the surfaces of the workpiece under the action of the first actuating means.

Since the mass of the carriage and of the elements supported thereon is small, the carriage can be operated by the second actuating means to move at any speed required by the speed of travel of the workpieces. For example, if welding seams, or projecting lugs on castings are to be finished and ground, the carriage can be operated to first move at the same speed as the workpiece while the tool operates on the workpiece, to pass the workpiece at a higher speed and to stop, so that the stopped tool again operates on the workpiece while the same is transported by the conveyor.

The supporting frame of the movable tool unit is preferably mounted on a supporting column for turning movement to a position in which the guide means of the frame extend in a direction transverse to the movement of the workpieces so that small workpieces can be finished by the tool in transverse direction, while moving with the conveyor means.

The supporting frame can also be adjusted about a horizontal axis to incline the axis of rotation of the tool if required by the shape of the workpiece. It is also advantageous to provide means to clamp the supporting frames to the supporting column at different levels in accordance with the height of the workpieces. When the frame is raised sufficiently high, and adjusted about a horizontal axis on the supporting means, the tool shaft can be placed in vertical position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2:
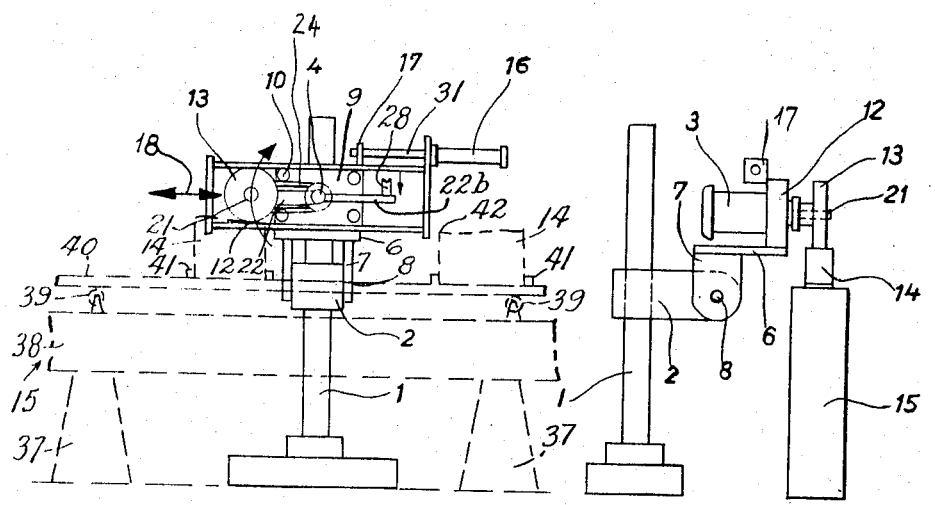
FIG. 1 is a fragmentary schematic front view of a control apparatus according to the invention.
FIG. 2 is a fragmentary schematic side view of the apparatus shown in FIG. 1.

Referring now to the drawings, and more particularly to FIGS. 1 and 2, a cantilever member 2 is guided on a vertical column 1 for movement in vertical direction, and can be clamped to column 1 in adjusted positions. Bracket means 7 are supported on member 2 for angular adjusting movement about a shaft 8, and carry a table 6. A frame 12 of rectangular configuration is supported on table 6 and has a pair of parallel guide rails supporting a carriage including a plate 9 and rollers 10 for movement in the direction of the arrows 18 parallel to the path of movement of workpieces 14 which are transported by conveyor means 15. As shown in FIG. 1, transporting means 15 includes a table 38 resting on legs 37 and carrying rollers 39 on which a conveyor band 40 moves. Workpieces 14 are clamped to conveyor band 40 by clamping means 41 and are moved past a grinding wheel 13 at a predetermined speed. An electric motor 3 is mounted on plate 9 and has a drive shaft 4 connected by a pulley and belt transmission 24 to a rotary tool, such as a grinding or polishing wheel 13 which is mounted on a double-armed lever 22 turnable about shaft 4 by a fluid operated motor having a piston rod 28 acting on an extension 22b of the lever 22. A cylinder 16 is secured to a lateral part of frame 12 and operates a piston connected by a piston rod to a projecting lug 17 on plate 9. The movable unit 5 including members 9, 10, 3, 4, and 13 can be moved in frame 12 at a selected speed in the same direction as the workpieces 14 and by selecting the speed of movement of the movable carriage in relation to the speed of conveyor band 40, the time during which the tool 13 engages and finishes a workpiece can be determined. If the movable unit moves at substantially the same speed as the workpiece 14, contact between tool 13 and the workpiece will be maintained for the longer time. If the unit is held at a standstill, tool 13 will engage a workpiece a shorter time only. If the tool passes the workpiece at a higher speed, and is then stopped and returned in the opposite direction, the tool will be twice in contact with the workpiece 14.

Figures 3, 4:
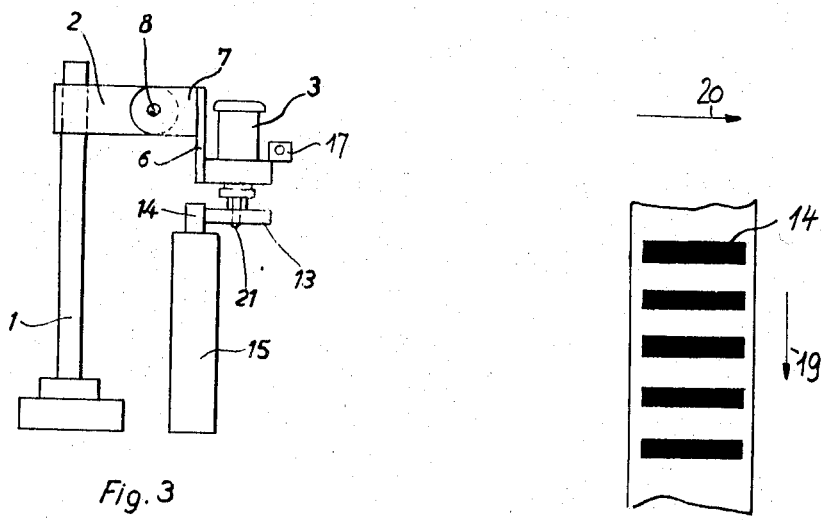
FIG. 3 is a fragmentary schematic view of a modified apparatus according to the invention.
FIG. 4 is a fragmentary plan view illustrating a conveyor transporting workpieces.

It is possible to swivel member 2 about column 1 to a position in which the guide frame 12 extends perpendicularly to the direction of movement of the workpieces. In this position, the tool is reciprocated in a direction transverse to the path of movement of the workpieces 14 which move in the direction of the arrow 19 shown in FIG. 4. Consequently, each workpiece 14 will be ground or polished by the rotary tool 13 while carriage 9, 10 moves in the direction of the arrow 20, and when the carriage is returned in the opposite direction, the operation is already terminated, and the next workpiece 14 approaches the vertical plane in which the tool is located and reciprocated. The speed of reciprocation of the tool can be selected in such a manner that the entire surface of a workpiece 14 is treated by the tool during a stroke in the direction of the arrow 20 before the workpiece moving in the direction of the arrow 19 at the speed of conveyor 15 has been transported out of the region of the tool 13. In the position of FIG. 3, bracket 7 is turned about shaft 8 so that grinding wheel 13 is horizontal and acts on lateral faces of the workpieces.

Figure 5:
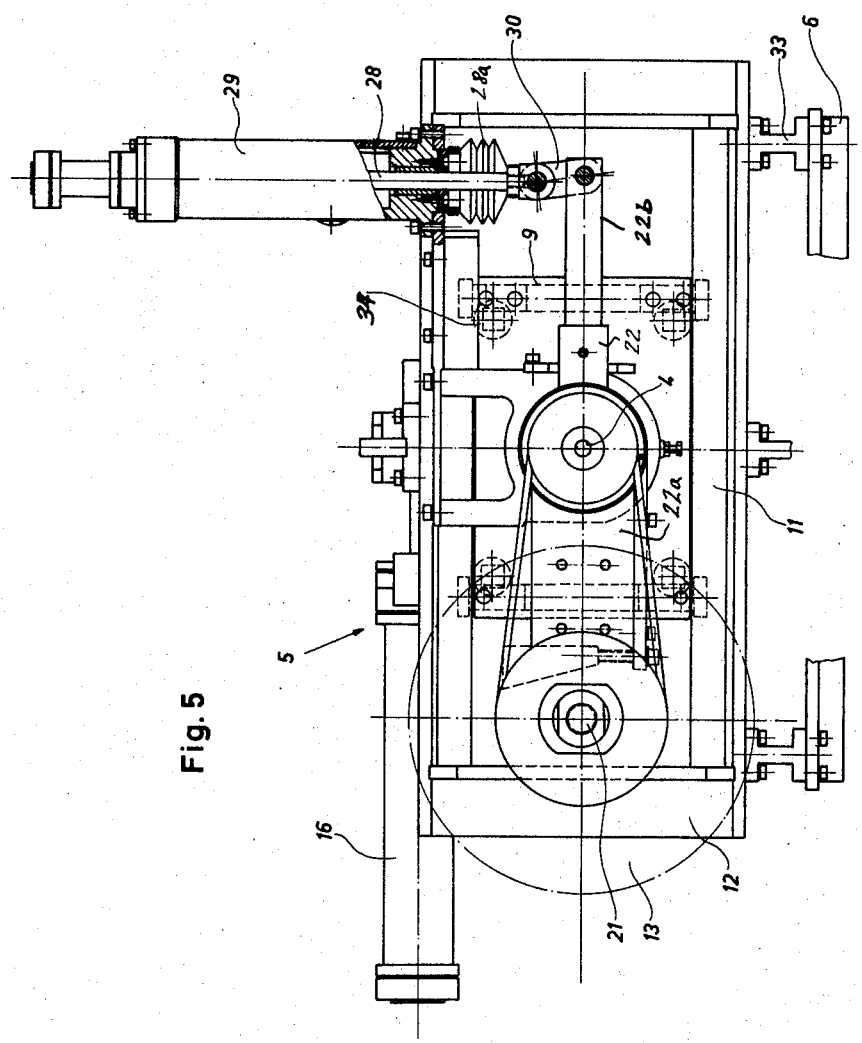
FIG. 5 is a front view, partially in section, and illustrating a preferred embodiment of the invention.
Figure 6:
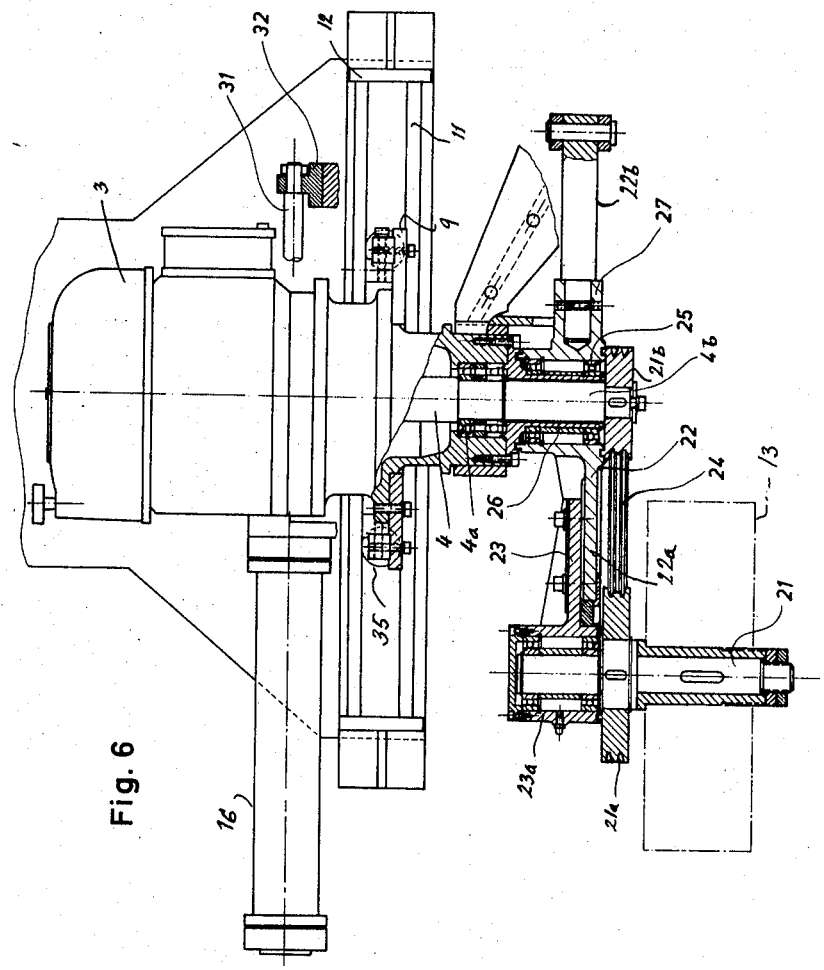
FIG. 6 is a fragmentary plan view, partially in section of the apparatus of FIG. 5.
Figure 7:
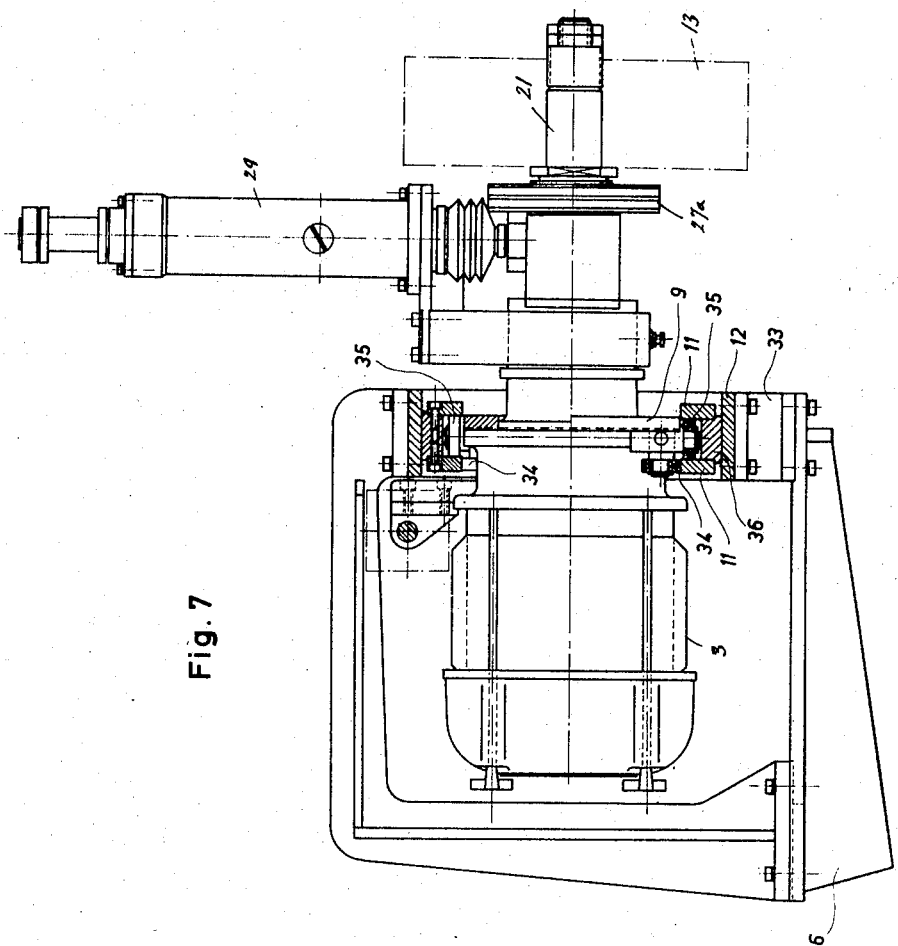
FIG. 7 is a side view, partially in section, of the apparatus shown in FIGS. 5 and 6.

A preferred embodiment of the invention is illustrated in FIGS. 5 to 7. A plate 9 supports an electric motor 3 and carries rollers 35 which are in rolling contact with the inner lateral faces of guide rails 11, and rollers 34 which roll on confronting faces of guide rails 11. Guide rails 11 form part of a guide frame 12 which is mounted by means of brackets 33 on a table 6 corresponding to table 6 of the supporting means 1, 2, 8, 6 described with reference to FIG. 2. Frame 12 also includes a pair of horizontal bars 36 respectively carrying pairs of rails 11 between which rollers 35 are located.

Motor 3 has a drive shaft 4 mounted in a bearing 4a of a housing, and having a projecting portion 4b carrying a bearing 25 on which a tool holder 22 in the form of a double armed lever is mounted for angular movement. A bearing 23a has an arm 23 secured by screws to the arm 22a of tool holder lever 22, and supporting a tool shaft 21 on which a tool, shown to be a grinding wheel or polishing wheel 13 is mounted. A pulley 21a is carried by tool shaft 21 and connected by V-belt 24 with a pulley 21b secured to drive shaft 4. Consequently, shaft 21 and tool 13 are rotated by motor 3, and the tool travels parallel to the guide means 11, 12 when carriage 9 moves along the guide rails 11 together with motor 3 and tool holder 22 supported on the shaft of motor 3.

As explained with reference to FIGS. 2 and 4, guide frame 12 can be mounted on supporting means either in a position extending parallel to the path of movement of workpieces 14 transported by conveyor 15, or transverse to this path.

A first actuating means includes a cylinder which is secured to frame 12 and a piston which reciprocates within the cylinder and which is connected with piston rod 28 which is articulated to a link 30 which is pivotally connected with arm 22b of tool holder lever 22. Cylinder and piston means 29 is fluid operated, and preferably a pneumatic servo motor. When arm 22b is moved downward by actuating means 29, 28 by the action of a spring 28a, tool shaft 21 and tool 13 are raised since lever 22 turns on bearing 25 and sleeve 26, as best seen in FIG. 6. When the piston of actuating means 28, 29 is operated to raise lever arm 22b, the tool shaft 21 and the tool 13 are urged downwardly so that the tool engages a workpiece carried by a conveyor underneath tool 13. The arrangement is similar to the arrangement shown in FIG. 1, and in the embodiment of FIGS. 5 to 7, transmission means 21a, 21b, 24 connect drive shaft 4 with tool shaft 21.

A second actuating means 16 includes a cylinder, and a piston which are fluid operated, for example a pneumatic servo motor. The piston rod 31 of actuating means 16 is secured to a bracket 32, see FIG. 6, which is connected to the carriage means, for example to plate 9 or to the housing of motor 3 by rigid part 17, not shown in FIG. 6 for the sake of simplicity.

Conveyor means 15, see FIG. 2, transports workpieces along a path located under the rotary tool 13. The pressure of fluid operated actuating means 28, 29 turns lever 22 and urges the peripheral surface of the grinding wheel 13 against the transported workpiece. The necessary pressure which depends on the material of the workpiece, and on the amount of metal which is to be removed from the surface, is determined by the pressure of the fluid supplied to actuating means 28, 29.

Actuating means 16 is operated to move the carriage with plate 9, motor 3, tool holder 22 and tool 13 at a selected speed so that the tool remains in contact with the transported workpiece during a time which depends on the selected speed of the carriage. Actuating means 16 is adjustable for this purpose. For example, if the tool moves at the same speed as the workpiece in the same direction, the tool will remain in contact with the workpiece the longest possible time, and then be returned to its initial position in the opposite direction so that the tool may operate on the next following workpiece. On the other hand, if the carriage is not operated by actuating means 16, and remains at a stand-still, the workpiece will pass the tool in a comparatively short time while being transported by the conveyor 15. In order to prevent any damage to the workpiece, the actuating means 28, 29 may be operated during the return stroke of carriage 9 in a direction opposite to the direction of the movement of the workpiece in such a manner that the tool is raised and does not engage the workpiece.

If the workpiece has a horizontal top surface, the tool will simply move along this surface without displacement of lever 22. However, if the treated surface is not planar, for example concave, convex, or inclined to a horizontal plane, lever 22 will be operated by actuating means 28, 29 to hold the peripheral surface of tool 12 in contact with a surface of the respective workpiece, while the same pressure of the tool on the workpiece is maintained. Since an inclined surface of a workpiece is longer than a corresponding horizontal surface of the workpiece, and consequently requires a longer time for a complete finishing operation, the carriage unit 9, 3, 22, 21, 13 is moved in the same direction in which the workpiece travels so that the tool remains in contact with the inclined surface of the workpiece a longer time, as is required by the greater area of the inclined surface as compared with a horizontal surface which would be the horizontal projection of the inclined surface. In the same manner, any workpiece requiring a longer period of treatment by the tool than other workpieces, can be maintained in contact with the tool for the required time by moving the tool at a selected speed in the same direction as the workpiece travels.

It will be understood that each of the elements described above, or two or more together, may also find a useful application in other types of tool control apparatus differing from the types described above.

While the invention has been illustrated and described as embodied in a tool carrying unit movable at a selected speed in the same direction as a transported workpiece, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Machine tool comprising, in combination, means for transporting workpieces at a predetermined speed along a path; supporting means including guide means extending parallel to said path; carriage means mounted on said supporting means for movement along said guide means a motor carried by said carriage means; tool holder means supported on said carriage means for movement therewith, and for movement transverse to said path toward and away from said workpieces, said tool holder means being connected with said motor and driven by the same; first actuating means supported on said supporting means and connected with said tool holder means for moving the same toward a workpiece; and second actuating means mounted on said supporting means and connected to said carriage means for moving the same along said guide means at a selected speed so that a tool held by said tool holder means is urged by said first actuating means against transported workpieces to follow the contour of workpiece surfaces which are not parallel to said path, and remains in contact with each workpiece for a time dependent on the ratio between said selected speed and said predetermined speed.

2. Machine tool comprising, in combination, means for transporting workpieces at a predetermined speed along a path; supporting means including guide means; carriage means mounted on said supporting means for movement along said guide means; drive means mounted on said carriage means for movement therewith and including a drive shaft; tool holder means including lever means supported on said carriage means for angular movement and a tool holder on said lever means moving transversely to said path toward and away from said workpieces during angular movement of said tool holder means, said tool holder being connected with said drive shaft and driven by the same while said drive means and tool holder means move with said carriage means; first actuating means supported on said supporting means and connected with said tool holder means for moving said tool holder toward a workpiece; and second actuating means mounted on said supporting means and connected to said carriage means for moving the same along said guide means at a selected speed so that a tool held by said tool holder is urged by said first actuating means against transported workpieces to follow the contour of workpiece surfaces which are not parallel to said path, and remains in contact with each workpiece for a time dependent on the ratio between said selected speed and said predetermined speed.

3. Machine tool comprising, in combination, means for transporting workpieces at a predetermined speed along a path; supporting means including guide means extending parallel to said path; carriage means mounted on said supporting means for movement along said guide means; drive means mounted on said carriage means for movement therewith and including a drive shaft; tool holder means including a lever means supported on said drive shaft for angular movement and a tool holder on said lever means moving transversely to said path toward and away from said workpieces during angular movement of said tool holder means, said tool holder being connected with said drive shaft and driven by the same while said drive means and tool holder means move with said carriage means; first yieldable fluid operated actuating means supported on said supporting means and connected with said tool holder means for moving said tool holder toward a workpiece; and second actuating means mounted on said supporting means and connected to said carriage means for moving the same along said guide means at a selected speed so that a tool held by said tool holder is urged by said first actuating means against transported workpieces to follow the contour of workpiece surfaces which are not parallel to said path, and remains in contact with each workpiece for a time dependent on the ratio between said selected speed and said predetermined speed.

4. Machine tool comprising, in combination, means for transporting workpieces at a predetermined speed along a path; supporting means including guide means extending parallel to said path; carriage means mounted on said supporting means for movement along said guide means; a motor mounted on said carriage means for movement therewith and including a drive shaft; a double-armed lever means supported on said drive shaft for angular movement; a tool shaft rotatably mounted on one end of said lever means and moving transversely to said path toward and away from said workpieces during angular movement of said lever means; transmission means connecting said drive shaft with said tool shaft for rotating the latter while said motor and said lever means move with said carriage means; first actuating means supported on said supporting means and connected with the other end of said lever means for moving said tool shaft toward a workpiece; and second actuating means mounted on said supporting means and connected to said carriage means for moving the same along said guide means at a selected speed so that a tool mounted on and rotated by said tool shaft is urged by said first actuating means against transported workpieces to follow the contour of workpiece surfaces which are not parallel to said path, and remains in contact with each workpiece for a time dependent on the ratio between said selected speed and said predetermined speed.

5. Machine tool as claimed in claim 4, said supporting means including a support and a rectangular frame having two spaced guide rails parallel to each other and to said path; and said carriage means including a plate, and roller means on said plate mounted on said guide rails so that said plate is movable parallel to said path.

6. Machine tool comprising, in combination, means for transporting workpieces at a predetermined speed along a path; supporting means including guide means extending parallel to said path; carriage means mounted on said supporting means for movement along said guide means; drive means mounted on said carriage means for movement therewith and including a drive shaft; tool holder means supported on said drive shaft for angular movement and including a tool holder moving transversely to said path toward and away from said workpieces during angular movement of said tool holder means, said tool holder being connected with said drive shaft and driven by the same while said drive means and tool holder means move with said carriage means; first fluid operated actuating means supported on said supporting means and including a movable member connected with said tool holder means for moving said tool holder toward a workpiece; and second actuating means mounted on said supporting means and including a movable member connected to said carriage means for moving the same along said guide means at a selected speed so that a tool held by said tool holder is urged by said first actuating means against transported workpieces to follow the contour of workpiece surfaces which are not parallel to said path, and remains in contact with each workpiece for a time dependent on the ratio between said selected speed and said predetermined speed.

7. Machine tool comprising, in combination, means for transporting workpieces at a predetermined speed along a path; supporting means including a support and a rectangular frame having two spaced guide rails parallel to each other and to said path; carriage means including a plate, and roller means on said plate mounted on said guide rails so that said plate is movable parallel to said path; an electric motor secured to said plate and including a drive shaft; a lever suppported on said drive shaft for angular movement; a tool shaft rotatably mounted on said lever and moving transversely to said path toward and away from said workpieces during angular movement of said lever; transmission means connecting said drive shaft with said tool shaft for rotating the latter while said motor and lever move with said carriage means; first yieldable fluid operated actuating means supported on said supporting means and connnected with said lever for angularly displacing the same so as to move said tool shaft toward a workpiece; and second actuating means mounted on said frame and connnected to said carriage means for moving the same along said guide means at a selected speed so that a tool mounted on and rotated by said tool shaft is urged by said first actuating means against transported workpieces to follow the contour of workpiece surfaces which are not parallel to said path, and remains in contact with each workpiece for a time dependent on the ratio between said selected speed and said predetermined speed.

8. Machine tool as set forth in claim 7 wherein said transmission means includes a pair of pulleys on said drive shaft and on said tool shaft, respectively, and a belt passing over said pulleys.

9. Machine tool as set forth in claim 7 wherein said guide rails have confronting faces and lateral faces; and wherein said rolller means include rollers engaging said lateral faces, and other rollers engaging said confronting faces.

10. Machine tool as set forth in claim 7 wherein said first fluid operated actuating means includes a cylinder secured to said frame, and a fluid operated piston, and linkage means connecting said piston with said lever.

11. Machine tool as set forth in claim 7 wherein said second actuating means includes a cylinder secured to said frame, and a fluid operated piston operatively connected to said plate for moving the same.

References Cited

UNITED STATES PATENTS

| | | | |
|---|---|---|---|
| 427,262 | 5/1890 | Fowler et al. | 51—55 |
| 1,609,564 | 12/1926 | Lund | 51—76 |
| 1,621,296 | 3/1927 | Waldron | 51—110 |
| 1,833,359 | 11/1931 | Fox et al. | 51—110 XR |
| 1,895,908 | 1/1933 | Blair | 51—283 |
| 2,799,978 | 7/1957 | Perry et al. | 51—110 |
| 3,295,261 | 1/1967 | Murray | 57—76 XR |

LESTER M. SWINGLE, *Primary Examiner.*